(No Model.)
T. H. McCRAY.
BELT GEARING.
No. 449,166. Patented Mar. 31, 1891.
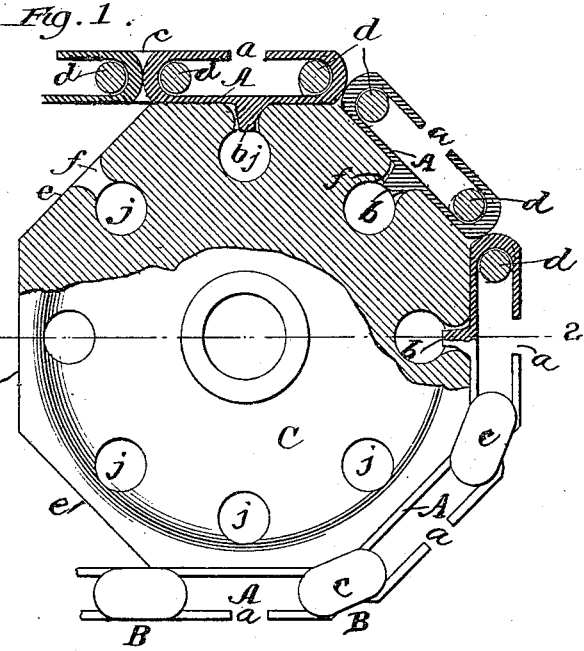
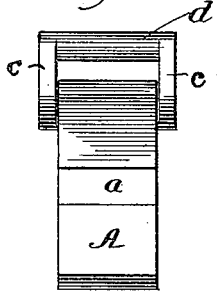
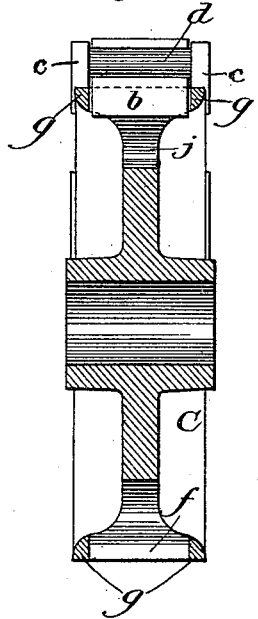
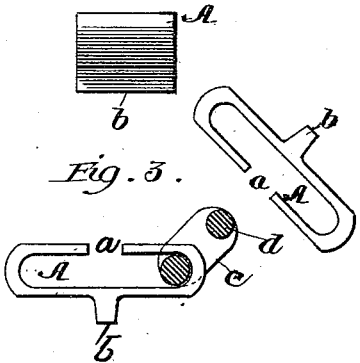
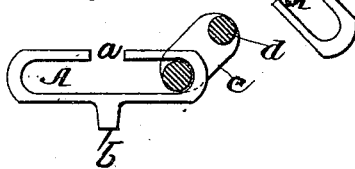
Witnesses:
Harry T. Jones.
Albert H. Adams.
Inventor:
Thomas H. McCray

UNITED STATES PATENT OFFICE.

THOMAS H. McCRAY, OF CHICAGO, ILLINOIS.

BELT-GEARING.

SPECIFICATION forming part of Letters Patent No. 449,166, dated March 31, 1891.

Application filed May 20, 1890. Serial No. 352,549. (No model.)

*To all whom it may concern:*

Be it known that I, THOMAS H. MCCRAY, residing in Chicago, county of Cook, and State of Illinois, and a citizen of the United States, have invented a new, useful, and Improved Belt-Gearing, of which the following is a specification, reference being had to the accompanying drawings, in which—

Figure 1 is a side view, part in elevation and part in vertical section, showing the cog-belt passing around the wheel. Fig. 2 is a section on line 2 2 of Fig. 1. Fig. 3 is a detail showing the manner of attaching or detaching one link of the belt from another. Fig. 4 is an end view of a cog-link, and Fig. 5 is a plan view of a cog-link and rectangular link.

The object of this invention is to provide an improved belt-gearing composed of detachable links and an improved wheel to drive or be driven by the cogs on the belt, which I accomplish as illustrated in the drawings, and as hereinafter described.

That which I claim as new will be pointed out in the claims.

In the drawings I have shown a portion of a cog belt or chain, which is composed of alternate elliptical links A and rectangular links B. Each elliptical link A is provided with a slot or opening $a$ on one side and with a cog $b$ on its opposite side. The rectangular link B consists of two side pieces $c$ and two cross-bars $d$. The cross-bars $d$ are made cylindrical and may be cast or formed with the pieces $c$. The opening $a$ in the side of each elliptical link A is just wide enough to admit a cross-bar $d$ of the rectangular link B. The links are coupled together by first inserting one cross-bar $d$ through the opening $a$ of one link and then moving the cross-bar down to the end of the first link, as shown in Fig. 3. The second elliptical link is then coupled to the rectangular link by placing the second link in substantially the position shown in Fig. 3 to permit the cross-bar to be readily passed through the opening and then passing the open link over the cross-bar. After the cross-bar has been passed through the opening the second link is drawn forward, bringing the cross-bar to the end of the link, as shown in section in Fig. 1.

The cross-bar $d$ of the rectangular links B are the proper distance apart to cause the ends of two adjoining elliptical links A to meet between the bars, as shown in section in Fig. 1, and the ends of the elliptical links A are rounded, so that in passing around a wheel the adjoining ends of the two links will bear against each other, thereby holding the belt steady and preventing backlash.

C represents a wheel which is adapted to drive or to be driven by the cog-belt above described. The periphery of this wheel C is provided with several bearing-surfaces $e$, each the length of a single belt-link A. The number of surfaces $e$ may be varied, according to the size of the wheel and length of the belt-links. Each surface $e$ of the wheel is provided with a recess $f$, adapted to receive a cog $b$. The sides of each recess $f$ are rounded, as shown in section in Fig. 1, to form engaging surfaces for the cogs $b$, and are so formed as to bear against the cog at its base. The cogs $b$ may be made the entire width of the belt-links A, or they may be made a part only of the width. The recesses $f$ of the wheel should be about equal in width to the width of the cogs $b$, leaving on each side a rim $g$.

The wheel C is provided with a hole $j$ at each recess $f$, through which dirt may be discharged to prevent the recesses from being filled up. When the wheel is large, it may be a spoke-wheel.

The bearing-surfaces $e$ of the wheel C are coequal with the length of the links A for the purpose of giving the links a firm support when turning with the wheel. This construction not only holds the cogs $b$ strongly in the recesses, but also prevents any tendency to strain the links A in passing round the wheel, and all tendency to spread or open the links at the slot or opening A. The turning strain is entirely taken by the short links B and the abutting of the links A at their curved adjoining ends prevents backlash at the under side of the chain when in use and the kinking of the chain by displacement of the link ends. The location of the cog midway of the length of the elliptical links A has the effect of shortening their action one-half either when driving or being driven, as the pull or push is only from the cog to the end of the link when the wheel and the cogs are engaged. By this midway location of the cog the chain may drive or be driven in either direction by the single cog on each link.

It will be observed that each of the links A is formed with a rectilinear plane side opposite the side which is provided with the cog $b$, and this rectilinear plane outer side contains the open slot $a$, which fulfills the conditions required for detachably engaging and disengaging the coupling-links of the drive-belt, and owing to this specific construction when a series of links are coupled to form a belt the top or outer surface of the latter forms a practically level surface.

What I claim as new, and desire to secure by Letters Patent, is—

1. A belt-gearing composed of elliptical links A and rectangular links B, said elliptical links A each having a cog $b$ on one side and an opening $a$ on the opposite side, and said rectangular links B each consisting of side pieces $c$ and cross-bars $d$, said cross-bars being constructed to bring the adjoining ends of the links A in contact, substantially as specified.

2. A detachable link for a drive-belt, formed with curved ends to constitute bearing-faces against contiguous links, having a cog $b$ on its inner side centrally between its curved ends and provided with the rectilinear plane outer side located opposite the cog, and having the open slot $a$ for engaging and disengaging the link at will with the coupling-links of the drive-belt, substantially as described.

3. A belt consisting of alternate elliptical links A and rectangular links B, said links A being provided with a slot $a$ on one side and a cog $b$ on its opposite side midway of its length, in combination with a wheel having cog-recesses at regular intervals, substantially as specified.

4. The detachable link for a drive-belt formed with curved extremities to constitute turning bearing-faces against contiguous links, having a cog $b$ on its inner side centrally between its curved extremities, and provided with a rectilinear plane outer side located opposite the cog, substantially as described.

THOMAS H. McCRAY.

Witnesses:
HARRY T. JONES,
A. H. ADAMS.